United States Patent
Ruthinowski et al.

(10) Patent No.: US 8,746,792 B2
(45) Date of Patent: Jun. 10, 2014

(54) ENERGY MANAGEMENT LOAD LIMITING VEHICLE SEAT MEMBER

(75) Inventors: Richard Ruthinowski, Taylor, MI (US); Ian Brewster Hall, Kensington, MD (US); Parakrama V. Weerappuli, West Bloomfield, MI (US); Brian Robert Spahn, Plymouth, MI (US); Kevin Siasoco, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 12/953,638

(22) Filed: Nov. 24, 2010

(65) Prior Publication Data

US 2012/0126591 A1    May 24, 2012

(51) Int. Cl.
*B60N 2/42*    (2006.01)

(52) U.S. Cl.
USPC ............... 297/216.1; 297/284.11; 297/452.5

(58) Field of Classification Search
USPC ............ 297/452.52, 452.53, 452.49, 452.5, 297/452.51, 452.54, 284.11, 216.1, 216.15, 297/216.16
See application file for complete search history.

(56) References Cited

U.S. PATENT DOCUMENTS

| | | | |
|---|---|---|---|
| 3,744,814 A | 7/1973 | Sturman | |
| 4,755,411 A | 7/1988 | Wing et al. | |
| 5,000,515 A | 3/1991 | Deview | |
| 6,170,915 B1 * | 1/2001 | Weisz | 297/452.5 |
| 6,254,183 B1 | 7/2001 | Bian et al. | |
| 6,517,154 B2 | 2/2003 | Sawamoto | |
| 6,739,658 B2 * | 5/2004 | Pedronno et al. | 297/216.1 |
| 6,767,057 B2 | 7/2004 | Neelis | |
| 6,908,149 B1 * | 6/2005 | Yamaguchi et al. | 297/216.1 |
| 7,422,291 B2 * | 9/2008 | Nagayama | 297/452.52 |
| 7,878,589 B2 * | 2/2011 | Murakami et al. | 297/284.11 |
| 2003/0034679 A1 * | 2/2003 | Choi | 297/216.1 |
| 2004/0160113 A1 * | 8/2004 | Rehfuss et al. | 297/452.52 |
| 2005/0231010 A1 * | 10/2005 | Nagayama | 297/216.1 |
| 2006/0061167 A1 * | 3/2006 | Adragna et al. | 297/284.1 |
| 2007/0013215 A1 | 1/2007 | Browne et al. | |
| 2009/0152931 A1 * | 6/2009 | Sahashi | 297/452.49 |
| 2011/0221254 A1 * | 9/2011 | Lindsay et al. | 297/452.18 |
| 2011/0221257 A1 * | 9/2011 | Ellison et al. | 297/452.48 |
| 2012/0049603 A1 * | 3/2012 | Ellison | 297/452.16 |

* cited by examiner

*Primary Examiner* — David R Dunn
*Assistant Examiner* — Alexander Harrison
(74) *Attorney, Agent, or Firm* — Franklin MacKenzie; Ford Global Technologies, LLC

(57) ABSTRACT

An energy management load limiting vehicle seat member or construction is shown with collision energy absorbing and anti-submarining features.

13 Claims, 4 Drawing Sheets

ENERGY MANAGEMENT LOAD LIMITING VEHICLE SEAT MEMBER

TECHNICAL FIELD

In vehicle collision events, the vehicle seat is an important load path and the vehicle seat may affect occupant performance metrics. In addition, during frontal impacts, vertical acceleration impulses may travel up child seats, and affect occupant results by causing the child seat base to hard contact the vehicle seat cross members. There is a need for a countermeasure that integrates collision energy absorption and anti-submarining features into a vehicle seat, thereby resulting in improved child and adult occupant safety performance.

SUMMARY

In one embodiment, the present application is directed to adding energy absorption properties into a vehicle seat in one, and preferably two regions. To reduce the potential for hard contact to the vehicle seat, one non limiting embodiment includes energy absorbing foam between a vehicle seat structural cross member and the vehicle seat comfort foam customarily used in vehicle seats. The energy absorbing foam is selected to provide anti-submarining bar, as well as to improve adult occupant responses to collision events.

In another non-limiting embodiment, the present application is directed to a seat structure including a multi-density foam or other material or structure added to function in contact with the seat structure, any seat structure cross members with cross sections and geometries or fluid filled bladders that may be utilized to manage energy transfer during an impact or collision event.

In another non-limiting embodiment, the present application may include energy absorption in the region of the seat near the back of the seat during an impact or collision event.

In another non limiting embodiment, the present application includes a vehicle seat with collision energy absorbing and anti-submarining features. The seat has a seat pan having a front and a rear portion, and a seat back affixed to the seat pan at its rear portion. Generally, the seat pan may be defined as having two longitudinal members separated by two transverse members to define a seat pan area wherein a seat suspension may be located. The seat suspension system may include at its rear portion an energy absorbing structure and an energy absorbing structure at its front end that also functions as an anti-submarining bar. In at least one non limiting embodiment, the non submarining bar may be composed of a multi density energy absorbing (EA) foam material placed between the front cross members and the comfort foam on the seat pan. In another embodiment, the EA foam may be located under the comfort foam of the seat cushion to reduce submarining.

Without limiting the structure of the seat, in another embodiment, the seat pan has two substantially parallel side rails and at least one rear structural cross member and a front structural cross member in opposed spaced apart relation to each other and extending between the side rails. The seat pan may include a suspension system for supporting the seat pan foam, which may, without limiting the embodiment, be defined to include a wire mesh comprised of a transverse front wire cross member and transverse rear wire cross member in spaced apart relation relative to each other and extending between the parallel side rails. The front and rear wire members may further be equipped with an energy absorbing suspension system, which may, in one non-limiting embodiment, be described as longitudinal wires members in spaced apart relation to each other and extending between the front and rear cross wire members. The front wire cross member may be attached to the front structural cross member and the rear wire cross member may be resiliently attached to the rear structural cross member. The seat may further includes a first collision energy absorbing feature at the front portion of the seat pan and a second collision energy absorbing feature at the rear portion of the seat pan.

These and other features and advantages may be discerned upon reference to the drawings and a reading of the following non limiting description

DETAILED DESCRIPTION

Figure 1:
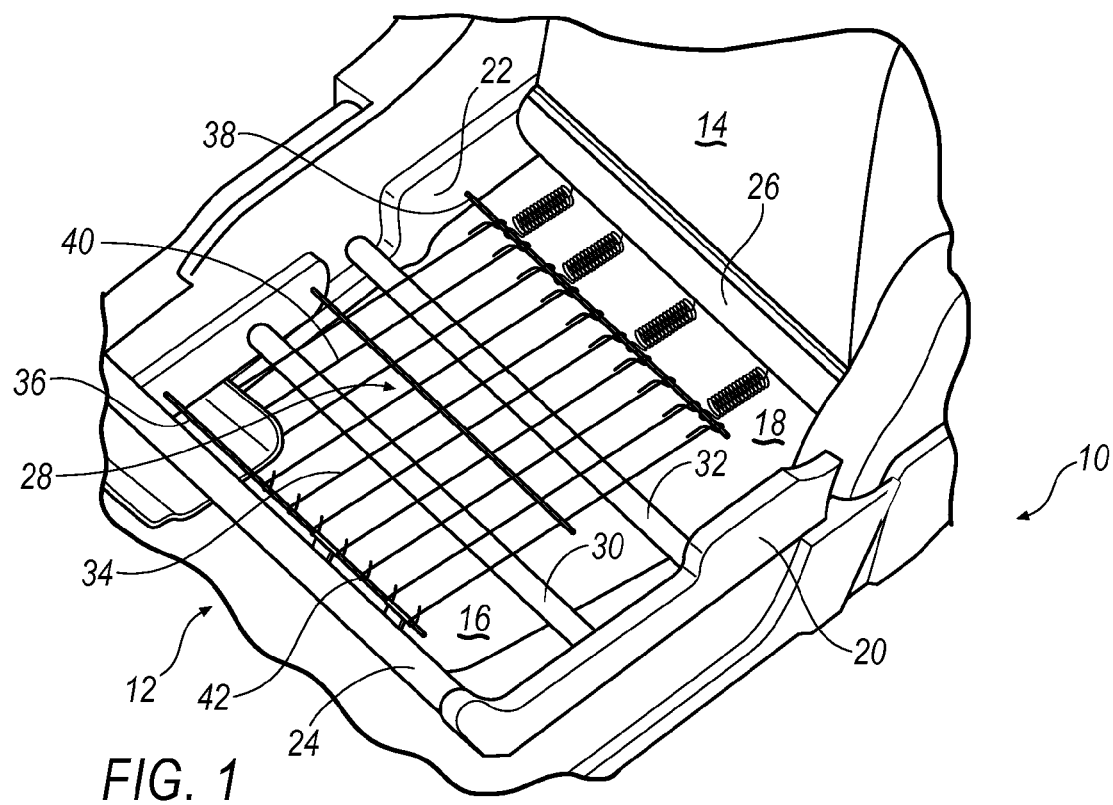
FIG. 1 is a schematic representation of a vehicle seat showing its internal structure.

Turning now to the drawings wherein like numbers refer to like structures, and particularly to FIG. 1, there is shown therein a detailed view of a vehicle seat 10 showing the construction of the seat pan 12 and the orientation of the seat back 14 relative to the seat pan. Specifically, in this non-limiting embodiment, the seat pan has a front portion 16 and a rear portion 18. Side rails 20 and 22, respectively are substantially parallel and are separated by front structural cross member 24 and rear structural cross member 26 to define the seat pan area 28. Optional structural cross members 30 and 32 are located in spaced apart relation to each other intermediate from the front and rear structural cross members and serve to give additional support to the side rails 20 and 22. The seat pan may also be equipped with a seat suspension system, shown in this non limiting embodiment as wire mesh 34 to impart resiliency and add to the comfort of the occupant when sitting in the seat. The wire mesh has a front wire cross member 36 in the front portion of the seat pan, and a rear wire cross member 38 in the rear portion of the seat pan. The front and rear wire cross members are separated by longitudinal wires shown collectively as 40, that are preferably, but not necessarily, parallel to and equidistant from each other and span the distance between the front wire cross member and the rear wire cross member to form a lattice structure. The front wire cross member may be attached to the front structural cross member by attachments shown collectively as 42. These attachments may be rigid or resilient, such that the front wire cross member is affixed to the front structural cross member in a manner that suits the design specifications of the seat manufacturer. Similarly, the rear wire cross member is attached to the rear structural cross member by rigid or preferably by resilient attachments, shown as coil springs but understood to be any resilient structure. Those skilled in the art recognize that there are many different ways to provide suspension to the seat pan, and that the described seat pan suspension is not to be understood as limiting in any way the various manners in which the seat suspension seat can be accomplished. For example, the suspension system may be comprised of thin straps, such as metal or plastic, or of composite materials.

Figure 2:
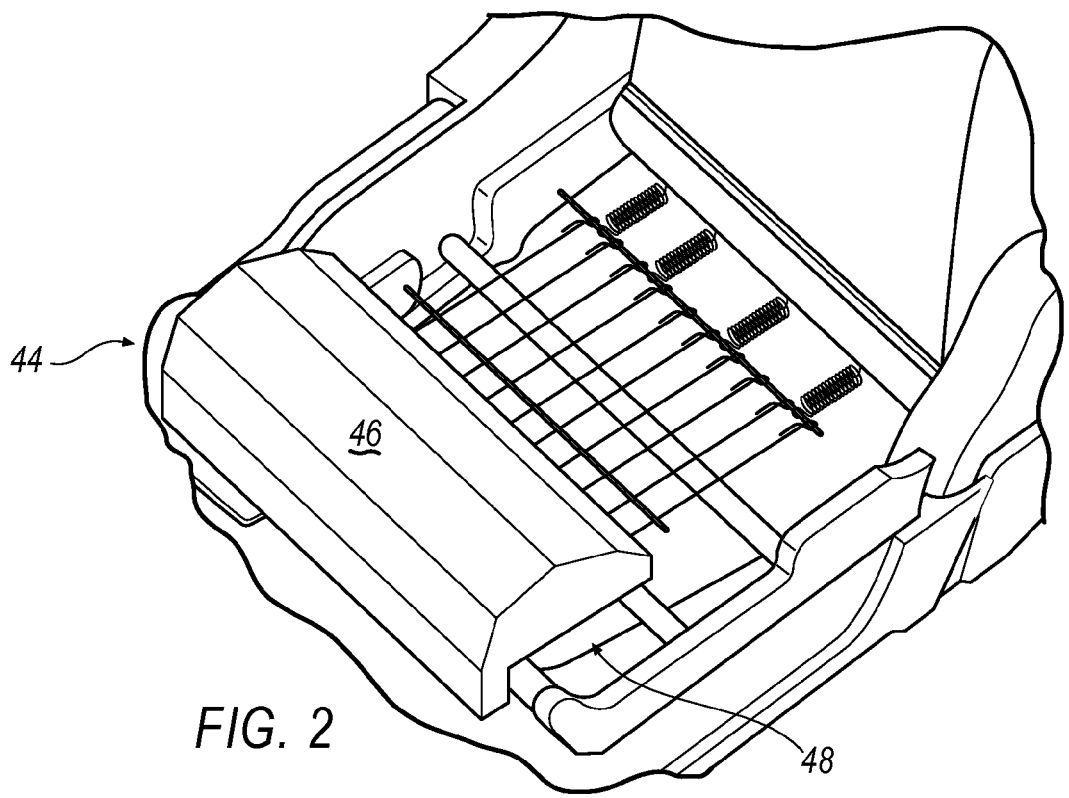
FIG. 2 is a schematic representation of a vehicle seat showing the location of a collision energy absorption feature.

Turning to FIG. 2, collision energy absorption feature 44 is shown in the seat pan area. Specifically, the collision energy absorption feature may be comprised of a multi density or stiffness foam member 46 affixed at the seat pan area's frontal end 48 to the front structural cross member, and extending at least one third of the seat pan area, preferably at least one half the area of the seat pan, and most preferably, extending in a gradient of from relatively stiff or dense foam at the front of the seat pan and declining as the energy absorbing foam extending to the rear of the seat pan area. Preferably the collision energy absorbing foam member is placed between the front structural cross member and any comfort foam that may be placed on the seat to provide for a comfortable and contoured seating surface to be provided for any seat occupant.

The collision energy absorption feature 44 may be generally comprised of multi-density EA foam material, and provides anti-submarining properties to the seat pan area in the event of an impact to the vehicle. This results in reduced occupant injury by eliminating hard contact between the adult occupant and the front cross members, and further reduces the forward movement of the occupant along the seat cushion and against the safety restraints, thereby reducing injury.

Figure 3:
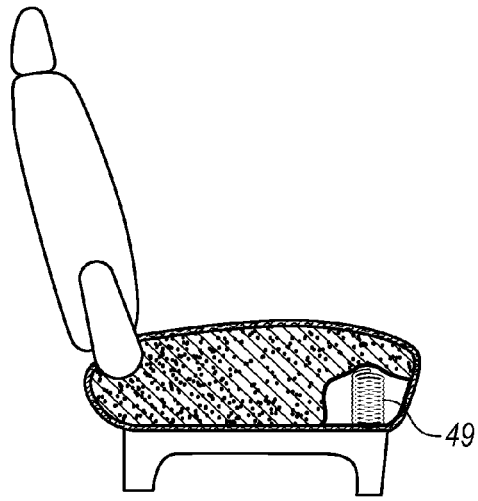
FIG. 3 is a schematic representation of a vehicle seat showing the location of another embodiment of a collision energy absorption feature.

FIG. 3 is a schematic representation of a vehicle seat showing another embodiment of a first collision energy absorbing feature. Specifically, it is also contemplated that the first collision energy absorption feature could be a hexcel collapsible spring element 49, or any other sacrificial metallic structure to provide crash energy absorption, that may be located between the cushion of the seat pan and the front footing of the vehicle.

Figure 4:
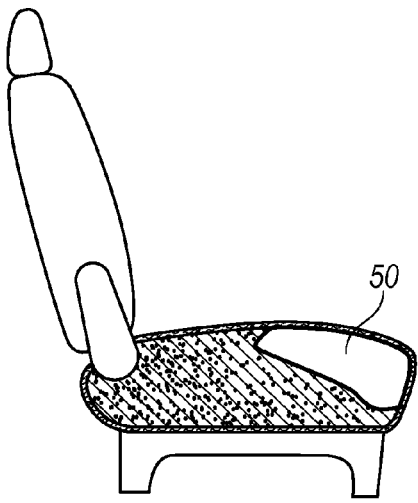
FIG. 4 is a schematic representation of a vehicle seat showing the location of another embodiment of a collision energy absorption feature.

FIG. 4 is a schematic representation of a vehicle seat showing another embodiment of a front collision energy absorption feature. In this embodiment, a fluid filed bladder 50 may be affixed to the front structural cross member. The fluid filled bladder may be selectively inflatable or fill able with a fluid in response to a perceived crash event to provide collision energy absorption when sensors (not shown) indicate that the vehicle is in a pre crash event. In another embodiment, the bladder may be fluid filled, preferable with a gas, so that the collision energy absorption feature is always present and operable.

Figure 5:
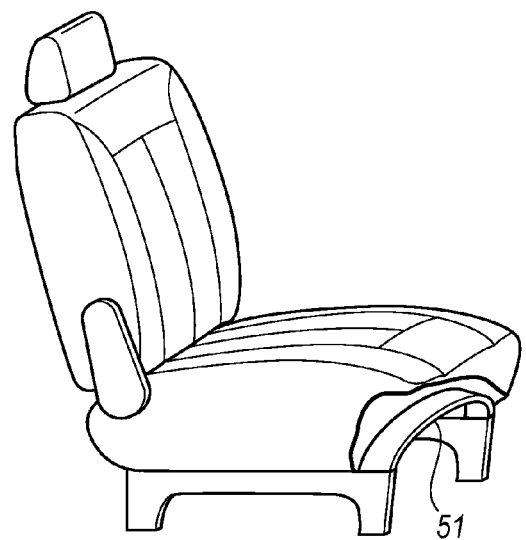
FIG. 5 is a schematic representation of a vehicle seat showing another embodiment of a collision energy absorption feature.

FIG. 5 is a schematic representation of a vehicle seat showing another embodiment of a front collision energy absorption feature. In this embodiment, a front cross bar 51 is shown that is lateral to the seat pan to attain the specific performance of front end energy absorption. The front cross bar is shown as U shaped, however, it is further contemplated that the front cross bar can be X shaped, or any other shape, to accomplish the required front end collision energy absorption properties.

Figure 6:
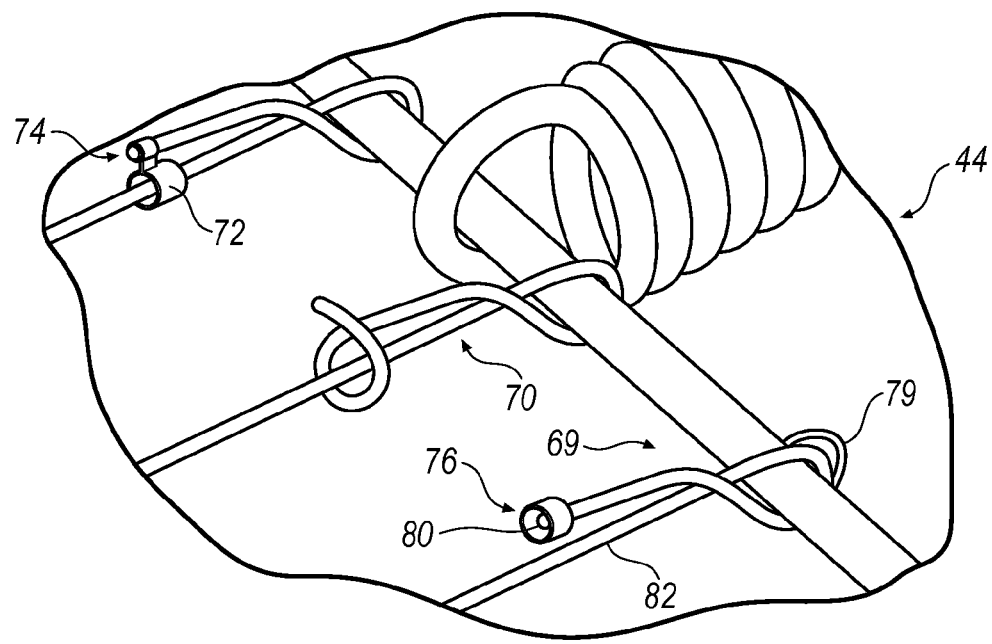
FIG. 6 is a detailed section of the rear portion of a vehicle seat showing another collision energy absorption feature.

FIG. 6 is a detailed section of the rear portion of the vehicle seat showing the interaction of the longitudinal wires with the rear wire cross member. Specifically, the routing of the wires is designed such that it allows for additional deflection during a crash event.

Several non-limiting embodiments are depicted in FIG. 6. For example, as the wire is placed under tension, the wire loop 69 will, in one embodiment, wrap around the rear wire cross member, thereby absorbing collision energy. A retention clip 76 may be used in the end 80 of the wire that does not cooperatively engage the longitudinal wire 82, but rather cooperatively engages the loop 79 on the rear wire cross member so that during a crash event, collision energy is transferred along the longitudinal wires, deforming the wires until the retention clip is engaged by the loop 79, thereby absorbing the crash energy.

A variety of hard stops may be added to retain the longitudinal wires in connection with the rear wire cross member during a crash event. For example, in another non limiting embodiment, the wire member may be looped around the cross member and include a clip 72 may be used that wraps around the end 74 and the wire to hold the loop in place. The clip includes a portion 73 that will permit the wire to be drawn through it, and is further equipped with a hard stop 75 securing fastened at the end 74. In the event of a collision event, the wire member is deformed, thereby pulling the clip portion toward the cross member. When the clip contacts the cross member, the wire deformation draws the clip and stop into engagement with the cross member, and the loop tightens.

In another embodiment, the wire is looped into a slip knot 70 that tightens as the wires deform during a collision event to absorb collision energy.

Figure 7:
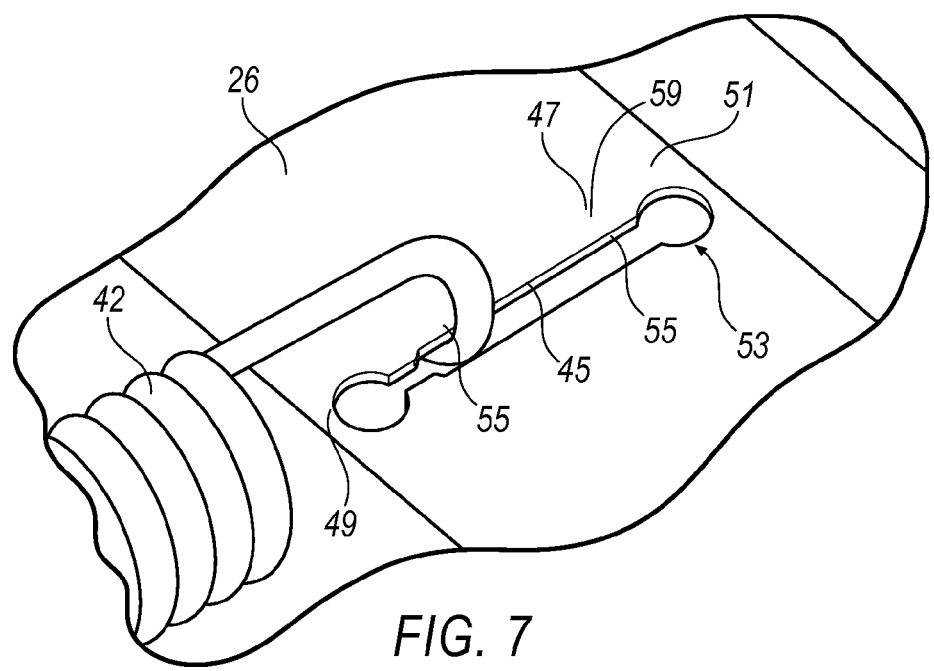
FIG. 7 is a detailed section of a rear portion of a vehicle seat showing another collision energy absorption feature.

FIG. 7 is a schematic representation of another embodiment of the energy management vehicle seat of the present application. Specifically, a resilient feature, shown as coil spring 42 has a loop 45 that extends from the end of the spring into a slot or aperture 47 in the cross structural member, shown as rear cross structural member 26. The slot has a tapering configuration 43 such that it accommodates the loop 45 at the insertion 41, but to too narrow to accommodate the loop. When a collision force is encountered the seat spring flexes, and the hook travels through the slot or aperture until it engages stop 49. As the collision force is transmitted from the spring to aperture or slot 47, the deformable narrower portion 55 of the aperture or slot deforms to allow the spring loop to travel along the length of the tapered slot, thereby deforming the slot and absorbing the collision energy. While shown as a detailed section of the rear portion of the seat, it is understood that the front portion, or the side portions of the seat could also be equipped as described herein.

Figure 8:
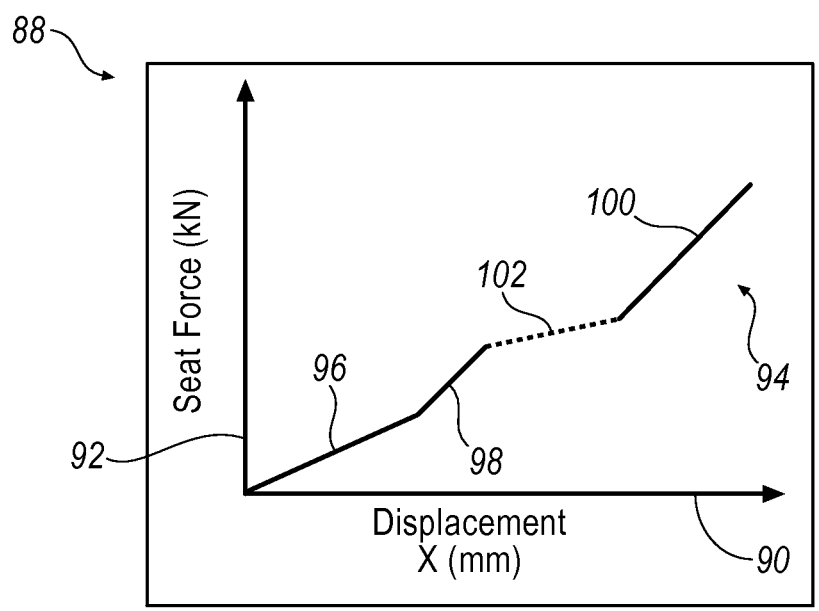
FIG. 8 is a graph representing the energy absorption from wire stroke during a collision event.

FIG. 8 is a graph 88 representing energy absorption of the seat from wire stroke during a collision event. X axis 90 is the displacement, or distance of wire stroke in millimeters, and y axis 92 is collision energy at the seat in kiliNewtons. Line 94 is the energy absorption of the seat during a collision event. Portion 96 is the energy absorption due to the action of the seat cushion that utilized the multi density or stiffness foam as described above. Portions 98 and 100 relate to collision energy absorption due to the springs on the seat. Portion 102 relates to the collision energy absorption from wire deflection during a crash event. It can be understood that the amount of collision energy absorbed or dissipated increases as the distance the seat travels during the crash event increases.

While the invention has been detailed in the specification, it is understood that the words used are merely descriptive and are not intended to be limiting. Those skilled in the art understand that many variations and modifications are possible without departing from the scope and spirit of the invention as set forth in the appended claims.

We claim:

1. A vehicle seat for collision energy management, comprising:
   a seat pan having a front and a rear portion,
   a seat suspension collision energy absorbing system connected to said seat pan; and a first collision energy absorbing feature at said front portion of said seat pan and a second collision energy absorbing feature at said rear portion of said seat pan, said second collision energy absorbing feature including at least one metal bar with an integrally formed loop and a deformable element positioned on the wire, the deformable element spaced from the rear portion and the integrally formed loop and configured to retain the metal bar to the rear portion of said seat pan in response to a collision event, the deformable element configured to absorb energy by facilitating deflection of the wire during the collision event.

2. The vehicle seat of claim 1, wherein said first collision energy absorbing feature exhibits substantially different stiffnesses along at least one of the said portions of said seat pan.

3. The vehicle seat of claim 1, wherein said first collision energy absorbing feature is a multi density energy absorbing foam material with a graduated foam density extending from the front portion to the rear portion.

4. The vehicle seat of claim 1, wherein said first collision energy absorbing feature is a collapsible structure arranged between the seat pan and the cushion.

5. The vehicle seat of claim 2, wherein said second collision energy absorbing feature includes a series of loops at the connection between the metal bars and a structural member at the rear portion of the seat pan;
said connection including routing the metal bars to form the loops around the structural member, wherein the loops wrap around the structural member in response to a collision event to provide deflection and absorb energy.

6. The vehicle seat of claim 5, further comprising a hard stop on at least one of said loops, the hard stop being configured to retain the metal bar on the structural member in the event of a collision event.

7. The vehicle seat of claim 6, wherein said hard stop includes a clip disposed on the metal bar and loop.

8. The vehicle seat of claim 6, wherein said hard stop includes a second loop configured to tighten upon absorbing collision energy.

9. The vehicle seat of claim 6, wherein said hard stop includes a retention feature configured to restrain the loop from losing contact with the structural member during a collision event.

10. The vehicle seat of claim 6, further including at least one hard stop on the structural member in close proximity to at least one of said loops to cooperatively engage a retention feature on said loop to absorb collision energy during a crash event.

11. A vehicle seat for collision energy management, comprising:
a seat pan having a front portion and a rear portion;
a seat suspension system in said seat pan adapted to accommodate a comfort foam, said suspension system deformable to attenuate collision forces during impact events;
an anti-submarining deformable structure positioned at said front portion of said seat pan; and
a collision energy absorbing feature including at least one metal bar with an integrally formed loop and a deformable element positioned on the wire, the deformable element spaced from the rear portion and the integrally formed loop and configured to retain the metal bar to the rear portion of said seat pan in response to a collision event, the deformable element configured to absorb energy by facilitating deflection of the wire during the collision event.

12. The vehicle seat of claim 11, wherein said antisubmarining deformable structure is a multidensity energy absorbing foam material placed between the seat suspension system and the comfort foam.

13. A vehicle seat for collision energy management, comprising:
a seat pan having a front and a rear portion;
a seat suspension collision energy absorbing system connected to said seat pan; and
a first collision energy absorbing feature at said front portion of said seat pan and a second collision energy absorbing feature at said rear portion of said seat pan, said second collision energy absorbing feature including at least one metal bar with an integrally formed loop having a hard stop spaced from the rear portion and configured to retain the metal bar to the rear portion of said seat pan in response to a collision event;
wherein said first collision energy absorbing feature exhibits substantially different stiffnesses along at least one of the said portions of said seat pan;
wherein said second collision energy absorbing feature includes a series of loops at the connection between the metal bars and a structural member at the rear portion of the seat pan;
said connection including routing the metal bars to form the loops around the structural member, wherein the loops wrap around the structural member in response to a collision event to provide deflection and absorb energy;
where the hard stop on at least one of said loops is configured to retain the metal bar on the structural member in the event of a collision event; and
wherein said hard stop includes a second loop configured to tighten upon absorbing collision energy.

* * * * *